(12) United States Patent
Hughes (10) Patent No.: US 9,073,131 B2
(45) Date of Patent: Jul. 7, 2015

(54) SLOTTING CUTTER AND INSERTS FOR SAME

(75) Inventor: Donald R. Hughes, Meadville, PA (US)

(73) Assignee: GREENLEAF TECHNOLOGY CORPORATION

( * ) Notice: Subject to any disclaimer, the term of this patent is extended or adjusted under 35 U.S.C. 154(b) by 27 days.

(21) Appl. No.: 13/612,502

(22) Filed: Sep. 12, 2012

(65) Prior Publication Data

US 2013/0028679 A1    Jan. 31, 2013

Related U.S. Application Data

(62) Division of application No. 12/070,982, filed on Feb. 22, 2008, now Pat. No. 8,267,625.

(60) Provisional application No. 60/891,642, filed on Feb. 26, 2007.

(51) Int. Cl.
| | | |
|---|---|---|
| *B23C 3/30* | (2006.01) | |
| *B23C 5/08* | (2006.01) | |
| *B23C 5/20* | (2006.01) | |
| *B23C 5/14* | (2006.01) | |

(52) U.S. Cl.
CPC ........... *B23C 5/08* (2013.01); *Y10T 409/30952* (2015.01); *Y10T 407/2288* (2015.01); *Y10T 409/303808* (2015.01); *Y10T 407/1962* (2015.01); *Y10T 407/1964* (2015.01); *Y10T 409/309184* (2015.01); *Y10T 409/10795* (2015.01); *B23C 3/30* (2013.01); *B23C 5/207* (2013.01); *B23C 2200/0416* (2013.01); *B23C 2200/205* (2013.01); *B23C 2200/367* (2013.01); *B23C 2220/366* (2013.01); *B23C 2226/18* (2013.01); *B23C 2226/27* (2013.01); *B23C 5/14* (2013.01)

(58) Field of Classification Search
CPC ...... B23C 3/30; B23C 5/08; B23C 2220/366; B23C 2215/04; B23C 2215/045; B23C 2215/56; B23C 2215/52; B23C 2222/00; B23C 2222/28
USPC ................. 409/131–132, 164, 165, 198, 221; 407/40, 41, 49, 51, 56
See application file for complete search history.

(56) References Cited

U.S. PATENT DOCUMENTS

| | | |
|---|---|---|
| 1,150,662 A | 8/1915 | Cornman |
| 1,224,273 A | 5/1917 | Canning |
| 1,429,618 A | 9/1922 | Muller |
| 1,830,813 A | 11/1931 | Tautz |

(Continued)

FOREIGN PATENT DOCUMENTS

JP            07299632 A  * 11/1995

*Primary Examiner* — Daniel Howell
(74) *Attorney, Agent, or Firm* — K&L Gates LLP (57) ABSTRACT

The present invention is directed to an insert, a slotting cutter assembly and a method for machining a plurality of slots in a metallic alloy part. The insert may comprise a cutting edge, at least one primary radius, at least two secondary radii and a clearance angle. The cutting edge may form a narrow outer end at a tip of the insert and a larger width region at a distance inward from the narrow outer end. The clearance angle may extend rearward from the cutting edge. The slotting cutter assembly may comprise a plurality of inserts and a cutter body. The cutter body may comprise a plurality of retaining slots and a plurality of support portions. The retaining slot may be configured to receive the insert. The support portion may provide support for the insert.

20 Claims, 8 Drawing Sheets

(56) References Cited

U.S. PATENT DOCUMENTS

| | | | |
|---|---|---|---|
| 1,938,717 A * | 12/1933 | Oxford | 407/79 |
| 2,557,404 A | 6/1951 | Armitage et al. | |
| 3,320,655 A * | 5/1967 | Schweitzer, Sr. et al. | 407/37 |
| 3,561,086 A | 2/1971 | Milewski et al. | |
| 3,818,561 A | 6/1974 | Montana et al. | |
| 3,865,575 A * | 2/1975 | Volin et al. | 420/94 |
| 3,940,835 A | 3/1976 | Friedline et al. | |
| 4,961,757 A | 10/1990 | Rhodes et al. | |
| 5,279,191 A * | 1/1994 | Buljan | 82/1.11 |
| 5,365,986 A | 11/1994 | Hooser | |
| 5,478,175 A | 12/1995 | Kraemer | |
| 5,676,505 A | 10/1997 | Gauss et al. | |
| 5,855,997 A | 1/1999 | Amateau | |
| 6,120,217 A | 9/2000 | Stadtfeld et al. | |
| 6,322,296 B1 | 11/2001 | Wetli et al. | |
| 6,632,050 B2 | 10/2003 | Erickson et al. | |
| 6,712,564 B1 | 3/2004 | Hughes et al. | |
| 6,893,195 B2 | 5/2005 | Wetli | |
| 6,909,988 B2 * | 6/2005 | Batzinger et al. | 702/181 |
| 7,634,957 B2 | 12/2009 | Ghosh et al. | |
| 8,267,625 B2 * | 9/2012 | Hughes | 409/234 |
| 2002/0182998 A1 | 12/2002 | Sicklinger | |
| 2003/0138301 A1 | 7/2003 | Kuerzel | |
| 2008/0206007 A1 | 8/2008 | Hughes | |

* cited by examiner

SLOTTING CUTTER AND INSERTS FOR SAME

CROSS-REFERENCE TO RELATED APPLICATIONS

The present application is a divisional application claiming priority under 35 U.S.C. §120 to co-pending U.S. patent application Ser. No. 12/070,982, filed Feb. 22, 2008, which in turn claims priority under 35 U.S.C. §119(e) to U.S. Provisional Patent Application Ser. No. 60/891,642, filed Feb. 26, 2007. Each of these earlier-filed patent applications is hereby incorporated herein by reference.

BACKGROUND OF THE TECHNOLOGY FIELD OF TECHNOLOGY

The present disclosure relates to cutting tools, cutting inserts, and techniques for machining metals and metallic alloys. The present disclosure more specifically relates to slotting cutters and cutting inserts adapted for use with such cutters, and to techniques for machining metals and alloys using such cutting tools.

DESCRIPTION OF THE BACKGROUND OF THE TECHNOLOGY

Slotting cutters are used in the metal working industry to machine full or partial slots in a part piece. A typical slotting cutter comprises a circular cutter body, and one or more high speed steel ("HSS"), carbide, or ceramic cutting inserts. These inserts are positioned around the periphery of the cutter body. The slotting cutter is attached to a machine spindle and rotated at speeds sufficient to remove material from a part piece when contact is made between the inserts and the part piece. Slotting cutters can be right hand, left hand or neutral, depending upon the axial location of the inserts on the cutter body.

A major concern in the cutting tool industry is retention of cutting inserts on the cutter body. The inserts must be securely and accurately fastened to the cutting tool body and also must be able to be quickly installed and replaced. Secure and accurate attachment is especially important when ceramic inserts are used because cutting speeds in excess of 1000 surface feet per minute ("SFM") are common and any slight insert movement or inaccuracy in the location of the inserts in designs where multiple inserts are used can result in catastrophic failure. These inserts must be fully retained both axially and radially.

Another major concern in the cutting tool and machining industry is the availability of machine time. Increased production may have a positive financial impact on production facilities. Personnel working in the industry are continually looking for ways to improve machine throughput and thus improvements in machine production. These solutions can be accomplished in a number of ways including improving performance on a particular machine or switching production to a more efficient machine from a less efficient machine.

Parts such as turbine disks typically have been machined using a technique known as broaching. Turbine disks are often found in various turbine assemblies. Multiple turbine disks are located along the length of a turbine shaft and are used to connect the turbine blades to the turbine shaft. A typical slot machined in the turbine disk corresponds to the shape of the end of a turbine blade. The turbine blade may then be fit into the slot of the turbine disk thus securing the turbine blade to the turbine disk. These turbine blades cause the turbine shaft to rotate when a gas or liquid is passed over the blades.

The slot formed in the turbine disk is normally machined using a broaching technique. Broaching is a type of machining where a cutting tool with a number of progressively increasing cutting edges is pushed or pulled over a machine surface to make a cut. For example, in turbine disk manufacturing, a "Christmas tree" or "fir tree" shaped keyway must be cut on the periphery of the turbine disk to accept a corresponding shaped end of a turbine blade. These keyways have been typically cut using broaching with a cutting tool that has progressively larger "fir trees" as the cut is made. Broaching is an extremely slow and costly method of machining. The broaches used to machine turbine disks typically include broach segments to rough and finish a slot. Other techniques have been attempted including grinding and wire electronic discharge machine ("EDM"). The use of a slotting cutter may provide a faster and more efficient method of machining rough slots on a turbine disk. Subsequent to machining the rough slots, the disk may be further machined to provide each of the slots with the shape required in the finished turbine component. This shape may be quite complex. Although finish machining may require the use of broaching, the rough slot is machined much more quickly, and potentially more cost effective, given the increased production of a slotting cutter versus a broaching machine.

Turbine disks are conventionally formed of nickel-based superalloys, such as Alloy 718 (UNS N017718) and Rene 95™ alloy. These nickel-based superalloys are often referred to as high temperature alloys. Nickel-based superalloys are very difficult to machine due to their hardness and abrasiveness, among other things. Metals are given a machinability rating which indicates the difficulty of machining that metal. A metal with a high machinability rating is much easier to machine than a metal with a lower machinability rating. Generally, the machinability rating of a nickel-based superalloy is approximately 10% of the machinability rating of cold-rolled steel. Broaching has typically been required to machine these alloys. Manufacturers of turbine disks have been looking for a method to machine turbine disks more quickly. What is needed is a less costly and more efficient method for machining turbine disks.

SUMMARY

In one general aspect, the present invention is directed to an insert, a slotting cutter assembly and a method for machining a plurality of slots in a metallic alloy part. The insert may comprise a cutting edge, at least one primary radius, at least two secondary radii and a clearance angle. The cutting edge may form a narrow outer end at a tip of the insert and a larger width region at a distance inward from the narrow outer end. The primary radius may be located at the tip of the insert. The two secondary radii may be located on opposite sides of the cutting edge near a mounting portion of the insert. The clearance angle may extend rearward from the cutting edge. The slotting cutter assembly may comprise a plurality of inserts and a cutter body. The cutter body may comprise a plurality of retaining slots and a plurality of support portions. The retaining slot may be configured to receive the insert. The support portion may be disposed on one end of the retaining slot and may provide support for the insert.

The method may include retaining a plurality of inserts within the cutter body of the slotting cutter and retaining the metallic alloy part in a part holder which is configured to move the metallic alloy part. The inserts may be fabricated from a ceramic material. The metallic alloy part may be a turbine disk. The slotting cutter may be operated to cause the cutter body to rotate about an axis. The part holder may be positioned such that a proposed slot location on the metallic alloy part is placed in line with the plurality of inserts and at a height which allows the plurality of inserts when cutting the metallic alloy part to form the depth of the slot. The part holder may be moved in a direction orthogonal to the axis of the cutter body such that the plurality of inserts contacts the metallic alloy part as the metallic alloy part moves orthogonal to the axis of the cutter body. A slot may be cut within the metallic alloy part with the plurality of inserts as the metallic alloy part moves orthogonally to the axis of the cutter body.

BRIEF DESCRIPTION OF THE DRAWINGS

Features and advantages of the novel articles described herein may be better understood by reference to the accompanying drawings in which.

The reader will appreciate the foregoing details, as well as others, upon considering the following detailed description of certain non-limiting embodiments of articles according to the present disclosure. The reader also may comprehend certain of such additional details upon carrying out or using the articles described herein.

DETAILED DESCRIPTION OF THE INVENTION

Figure 1A:
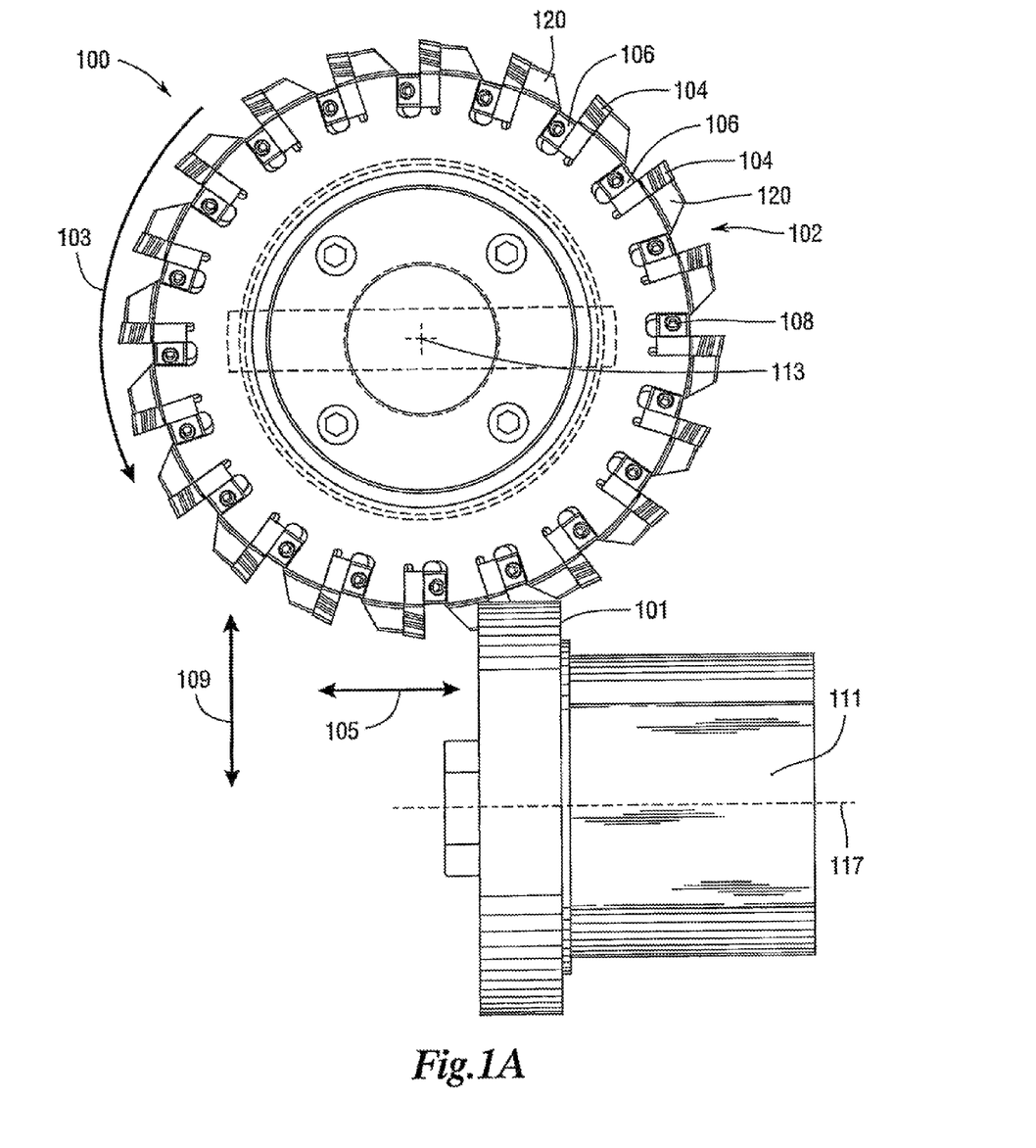
FIG. 1A is a face view of an embodiment of a slotting cutter according to the present disclosure.
Figure 1B:
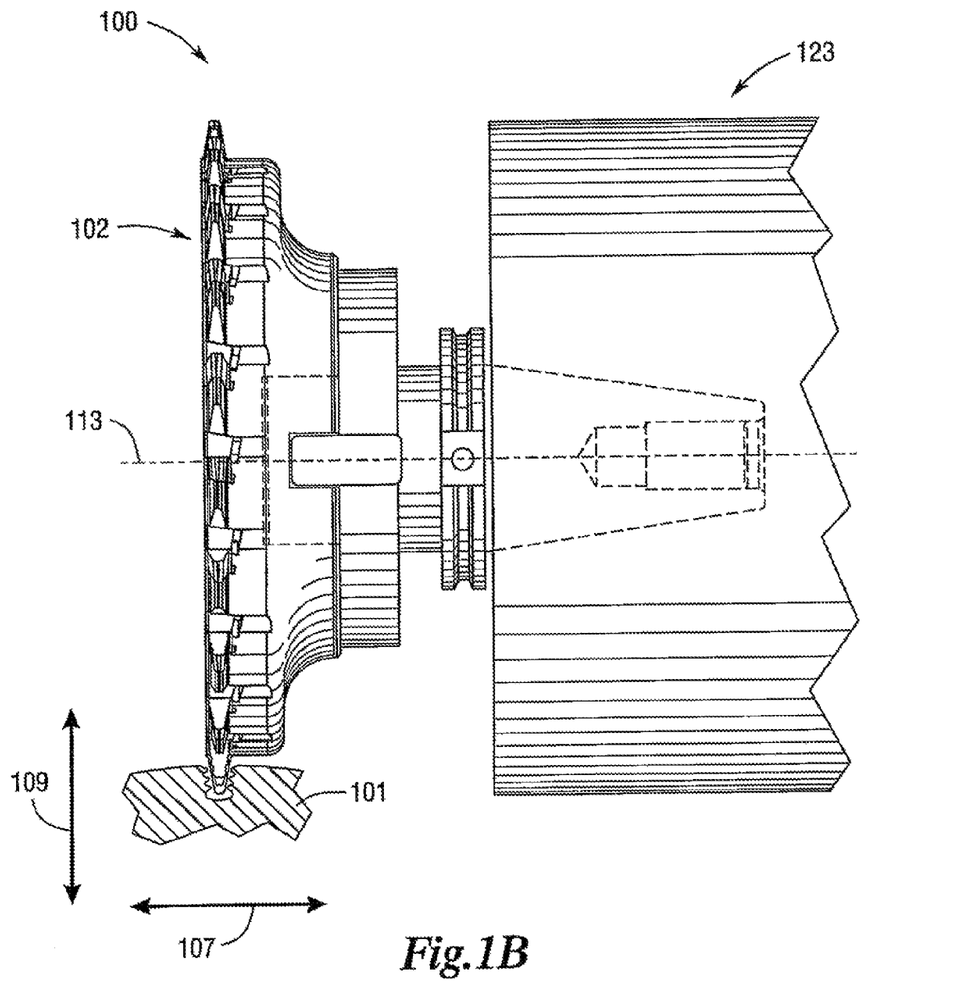
FIG. 1B is a side view of an embodiment of the slotting cutter of FIG. 1A.
Figure 1C:
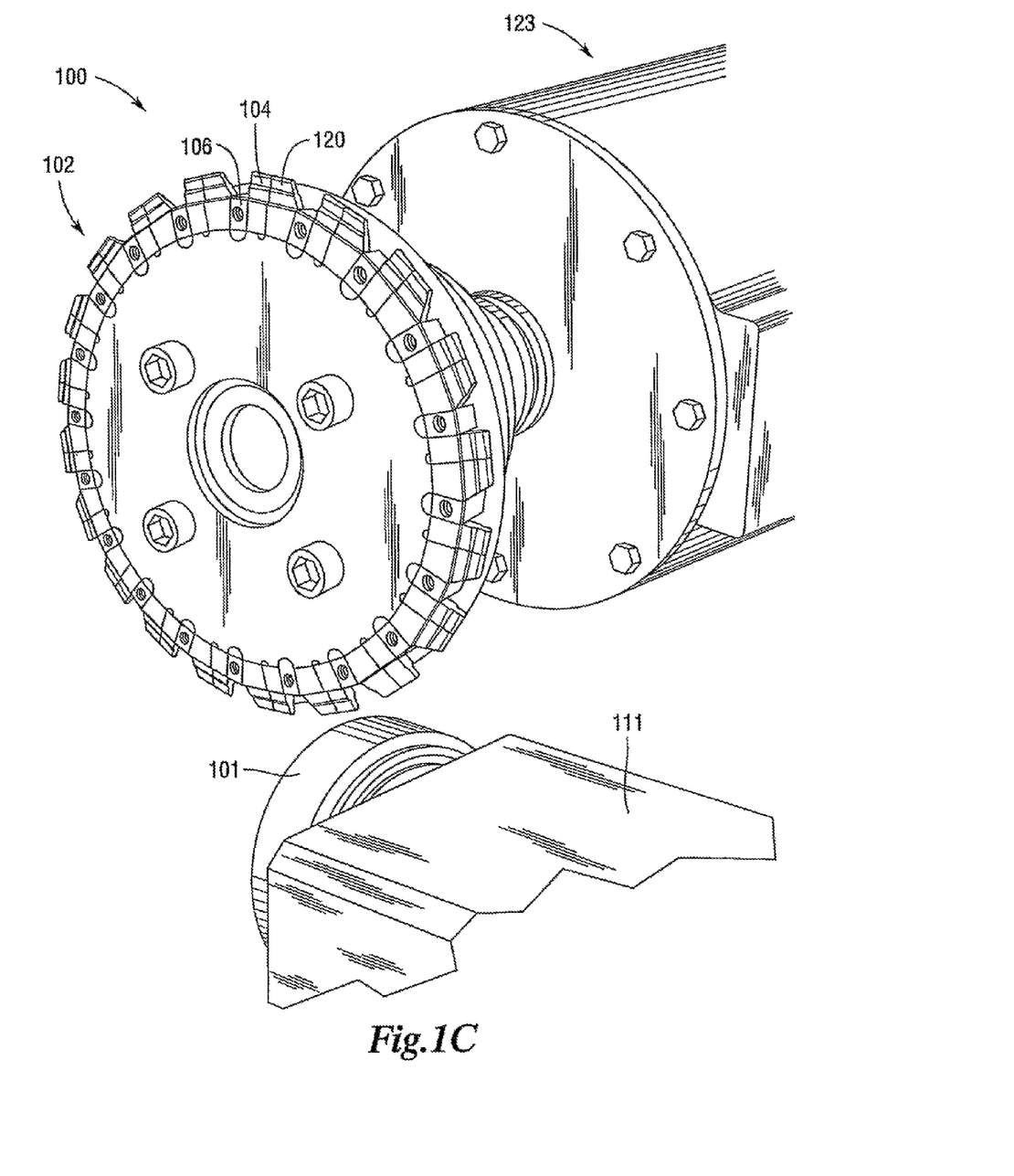
FIG. 1C is a perspective view of an embodiment of the slotting cutter of FIG. 1A.

According to various embodiments, the present invention is directed to inserts, a slotting cutter assembly and methods for machining slots in metal and metallic alloy piece parts. This method may use a slotting cutter 100, as shown in FIGS. 1A-1C. FIG. 1A is a face view of an embodiment of the slotting cutter. FIG. 1B is a side view of an embodiment of the slotting cutter. FIG. 1C is a perspective view of an embodiment of the slotting cutter. The slotting cutter 100 may comprise a cutter body 102 and a drive assembly 123. In one embodiment, inserts 104 may be used in the machining process which may be securely retained within the cutter body 102. An important application where an embodiment of the present invention has proven useful is for machining of rough slots in disks used in aerospace turbine engines. These rough slots are eventually machined into finished slots which have a profile which correspond to a shape on an end of a turbine blade. As discussed previously, the turbine blades can then be fit into the slots on the turbine disk.

The arrangement of the slotting cutter 100 along with a work piece, such as a turbine disk 101, is shown in FIGS. 1A-1C. As can be seen in FIG. 1A-1C, the slotting cutter 100 may comprise a cutter body 102. The cutter body 102 may be mounted on a machine spindle so that the cutter body 102 may be rotated about its axis 113. The axis 113 of the cutter body 102 and the axis 117 of the turbine disk 101 may be arranged such that they are substantially orthogonal. The cutter body 102 may be configured to rotate about its axis 113. In various embodiments, the cutter body 102 may rotate in the counter clockwise direction, as indicated by the rotation arrow 103, as shown in FIG. 1A. In various other embodiments, the slotting cutter may be configured to rotate in the opposite direction (i.e., clockwise, as shown in FIG. 1A).

According to various embodiments, the turbine disk 101 may be retained in a part holder 111. The part holder 111 may be a portion of a part holder assembly. The turbine disk 101 may generally be held in a fixed position to allow the slotting cutter 100 to machine a slot in the turbine disk 101, and then may be rotated about its axis 117 to the next position where a slot may be machined. For example, the turbine disk 101 may be rotated in an index fashion to each slot location once the machining of a slot is completed, whereas the slotting cutter 100 may be rotated continuously to machine the slot. The turbine disk 101 may be rotated in either direction about its axis 117. Once the turbine disk 101 is rotated into position, the part holder 111 advances in a feed direction, or x direction, as shown by the feed arrow 105 in FIG. 1A, through the cutter body 102 until the rough slot is completely cut in the periphery of the turbine disk. Once the slot has been cut, the part holder 111 substantially returns to its initial position, and the turbine disk 101 is rotated into position for the cutting of the next slot. The part holder 111 may be moved in any of an x direction (i.e., the feed direction), a y direction, as illustrated by y arrow 107 in FIG. 1B, or in a z direction, as illustrated by z arrow 109 in FIG. 1A. The y direction may be used to accurately place the turbine disk 101 in a position relative to the cutter body 102 to have the slot machined in the correct position on the turbine disk. The z direction may be used to set the height of the turbine disk 101 to set the depth of the slot to be machined by the cutter body 102.

Figure 2A:
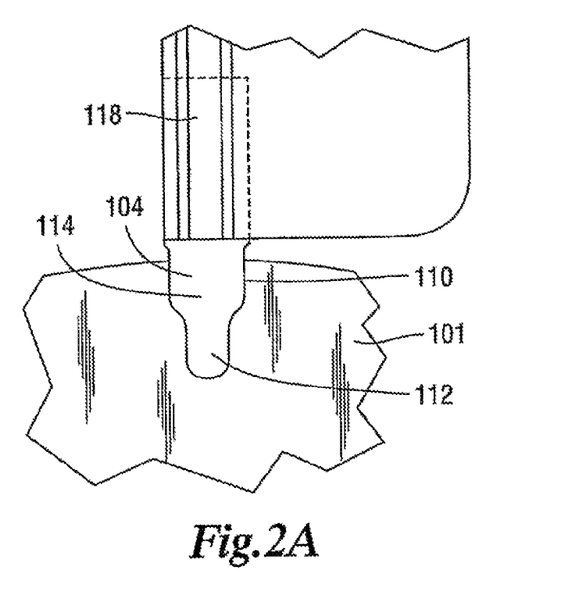
FIG. 2A is a view of an insert disposed within a rough slot of a turbine disk looking along the axis of the turbine disk.
Figure 2B:
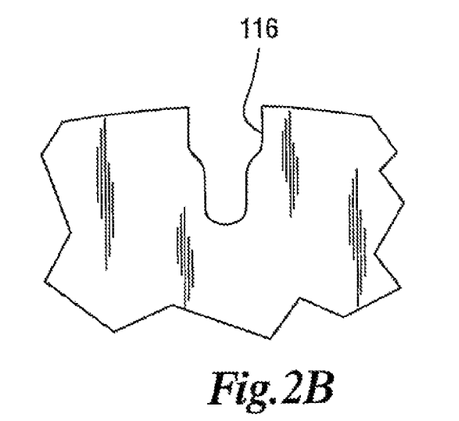
FIG. 2B is a view of a rough slot of the turbine disk looking along the axis of the turbine disk.
Figure 2C:
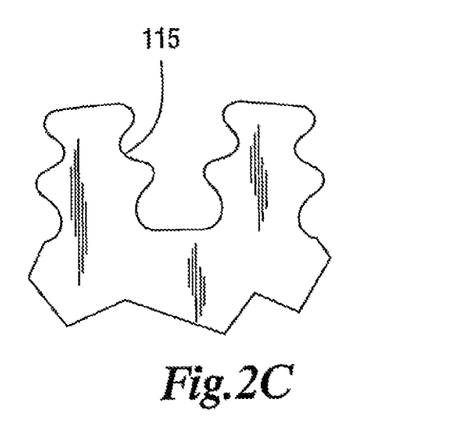
FIG. 2C is a view of a finished slot of the turbine disk looking along the axis of the turbine disk.

FIG. 2A is a view of an insert 104 disposed within a rough slot 116 of the turbine disk 101 looking along the axis 117 of the turbine disk 101. FIG. 2B is a view of a rough slot 116 without the insert 104. The rough slots 116 may have a profile substantially the same as the profile of the insert 104. As shown in FIG. 2C, which depicts a finished profile of a turbine disk slot, the finished slots 115 may have a unique stepped shape, sometimes referred to as a "Christmas tree" or "fir tree" shape, which is difficult to machine. The machining of the rough slots 116 may be accomplished more quickly if performed using a slotting cutter 100 rather than a broach. A prior slotting cutter design had been proposed but the design was shown to not be commercially viable. The prior slotting cutter design proved costly to produce and operate. The prior slotting cutter design required the use of more than one style or type of cutting insert, which significantly increased operating costs. For example, a narrow insert may have been used to machine the full depth of the slot, and another wider insert may have been used to machine the full width of the slot. Also, due to the nature of the earlier slotting cutter designs, a high level of care and accuracy was necessary when installing inserts to insure proper location and lock-down. Some slotting cutters used in the industry employ a cartridge arrangement, where the insert is placed in a cartridge and the entire cartridge is then held in the cutter body, to hold the inserts on the tool. These types of slotting cutters may potentially add substantial cost and significant complexity to the design.

According to various embodiments of the present invention, the method used in slot cutting may be unique for at least the reason that it has been shown to achieve fast and economical rough machining of slots 116 in smaller turbine disks. Rough slots 116 may be formed in such disks to have a depth in the range of ⅛ inch to ¾ inch and a width in the range of ³⁄₃₂ inch to ½ inch. Generally, the rough slots may have a depth up to ¾ inch and a width up to ½ inch, but both the depth and the width of the slots 116 may vary. The inserts 104 must generally follow the dimensions of the rough slots 116. The inserts may be configured to cut a depth in the range of ⅛ inch to ¾ inch and a width in the range of ³⁄₃₂ inch to ½ inch. For example, in one embodiment, the inserts 104 may be configured to cut a depth of ¾ inch and a width of ½ inch in the rough slot 116.

Figure 3:
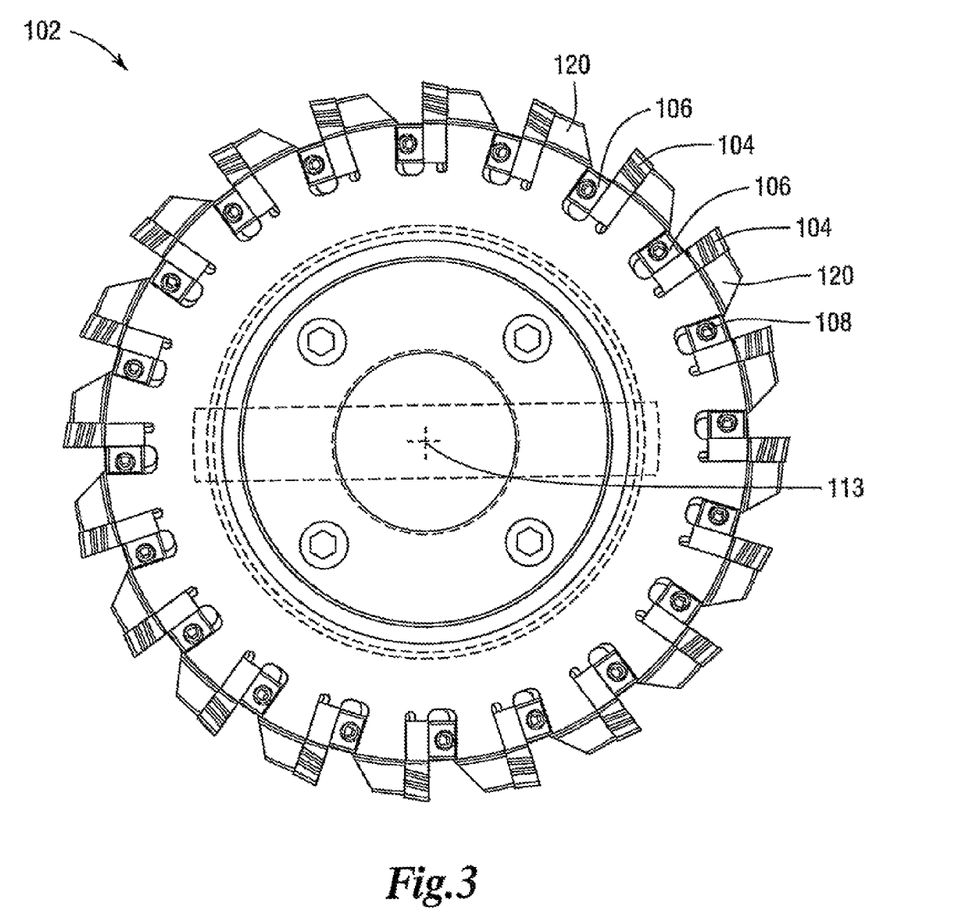
FIG. 3 is a side view of a face of a cutter body.
Figure 4:
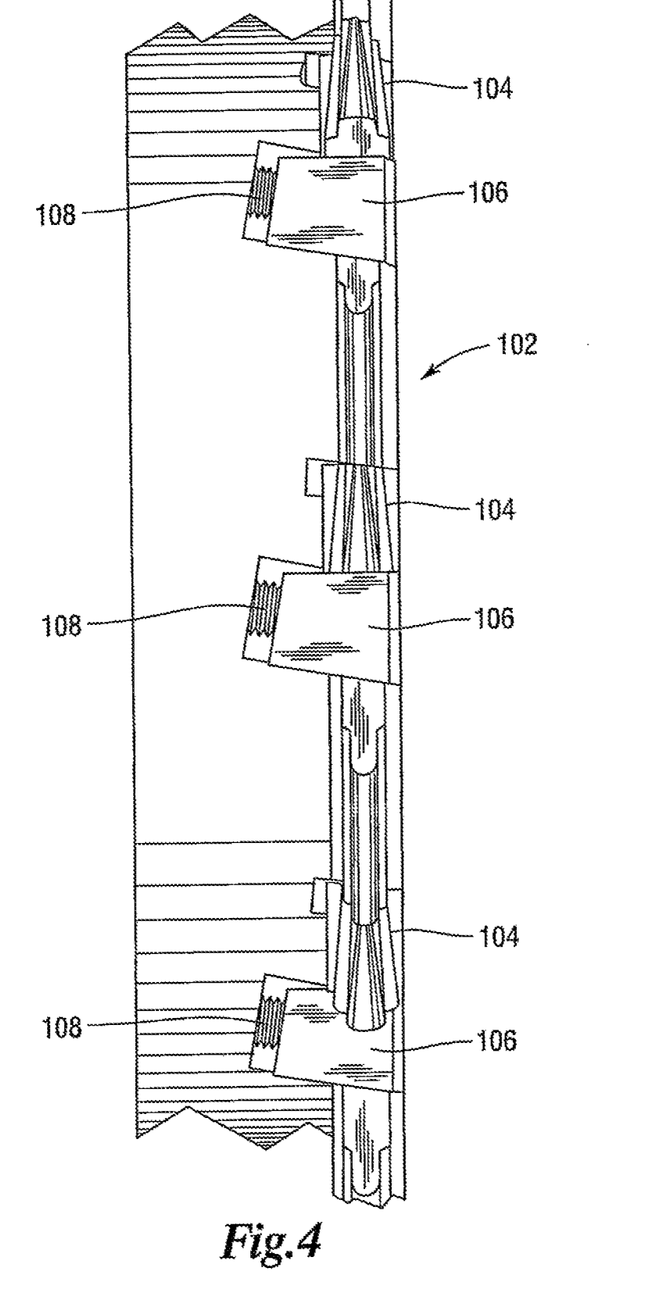
FIG. 4 is an end view of the cutter body of FIG. 3.
Figure 5:
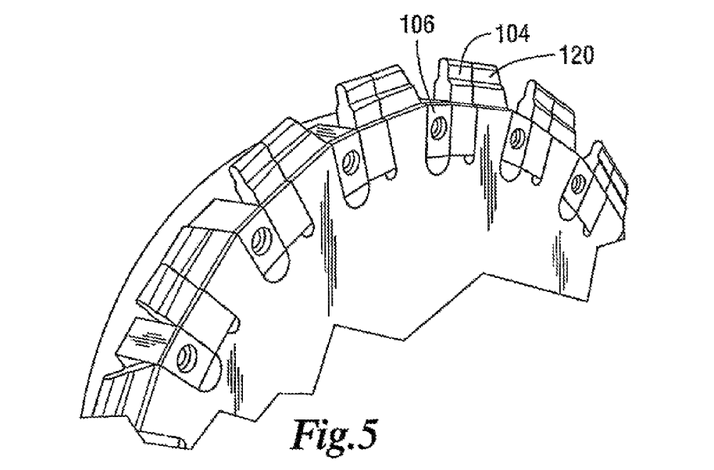
FIG. 5 is a perspective illustration of the cutter body of FIG. 3.

FIG. 3 is a face view of an embodiment of the cutter body 102 according to the present disclosure. FIG. 4 is a side view of the same cutter body. FIG. 5 is a perspective illustration of the same cutter body 102. The slotting cutter 100 may include the cutter body 102, which may be disk-shaped and adapted to be rotated about its axis 113. A plurality of cutting inserts 104 may be retained on the cutter body 102. As shown in FIG. 2, each insert 104 may have a shape similar to, but smaller than, the shape of the finished slot. Each of the inserts 104 may be retained on the cutter body 102 by a wedge-like fastener 106. The inserts 104 may be retained on the periphery of the cutter body 102. The inserts 104 may be retained axially in the same position or in different positions. In a preferred embodiment, the inserts 104 are axially retained in the same position on the side of the cutter body 102 away from a drive motor. The wedge-like fastener 106 may be secured to the cutter body 102 by a screw 108. The screw 108 may extend through the wedge-like fastener 106 axially into the cutter body 102. The screw 108 may be a double-acting screw, where one end of the screw 108 has right-hand threads and the other end has left-hand threads, or the screw 108 may be any other suitable type of screw.

In various embodiments, as shown in FIG. 2A, the inserts 104 may have a continuous cutting edge 110 which may be formed to cut a smaller width slot near the tip of the insert and a larger width slot at a distance inward from the tip. The insert 104 may include a larger width region 114 and a smaller width region 112. The cutting edge 110 may extend around the periphery of the top insert 104, generally covering the smaller width region 112 and the larger width region 114 of the insert. A mounting portion 118 of the insert 104 is shown in dotted lines and may be accurately positioned on and secured to the cutter body 102 of the slotting cutter 100. In various embodiments, it may be apparent that the cutting insert's 104 stepped profile would cut out a rough form of the slot 116, which may then be further machined to provide the finished slot profile 115 shown in FIG. 2C. The finished machining may be accomplished with a broaching machine or any other suitable machining process. Although the rough slot 116 shown in FIG. 2B is a rough slot 116 which will eventually be machined to a finished slot 115 of the "Christmas tree" or "fir tree" style, any suitable slot profile may be formed using this process including a simpler shape, such as a single width slot, or a more complex shape, such as a rough slot which will eventually be machined to form a more detailed "Christmas tree" shape.

Figure 6A:
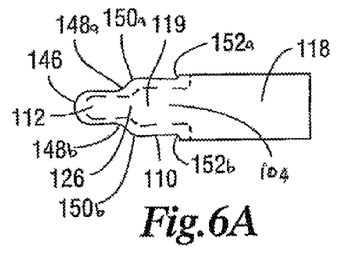
FIG. 6A is a drawing of a cutting face of one embodiment of a cutting insert.
Figure 6B:
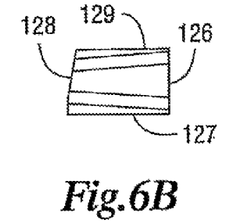
FIG. 6B is a top view of the cutting insert of FIG. 6A.
Figure 6C:
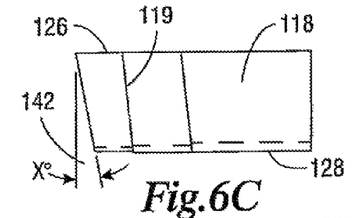
FIG. 6C is a left side view of the cutting insert of FIG. 6A.
Figure 6D:
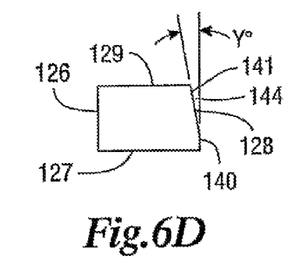
FIG. 6D is a bottom view of the cutting insert of FIG. 6A.

FIGS. 6A-6D are drawings of an embodiment of the cutting inserts 104 according to the present disclosure. FIG. 6A is a drawing of a cutting face of one embodiment of the cutting insert. FIG. 6B is a top view of the cutting insert. FIG. 6C is a left side view of the cutting insert of FIG. 6A. FIG. 6D is a bottom view of the cutting insert. As shown in FIGS. 6A-6D, the insert may have a cutting portion 119 and the mounting portion 118. The mounting portion 118 may be secured within the cutter body 102. The inserts 104 may also have a cutting face 126 or top face and a backwall 128 or bottom face. The cutting face 126 may preferably be substantially flat. The cutting face 126 may connect a left sidewall 127 of the mounting portion 118 and a right sidewall 129 of the mounting portion 118 on one side of the insert, and the backwall 128 may connect the left sidewall 127 and the right sidewall 129 on the other side of the insert. The cutting edge 110 may be formed at the junction of the cutting face 126, the left sidewall 127 and the right sidewall at the cutting portion 119 of the insert 104. The cutting edge may be formed at the periphery of the cutting portion 119. The cutting face 126 may intersect the left sidewall 127 and the right sidewall 129 at substantially right angles (e.g., 90°). The backwall 128 may form a dovetail portion of the mounting portion 118 of the insert 104. The backwall 128 may be non-flat. For example, the backwall 128 may comprise a first portion 140 which may parallel the cutting face 126 and a second portion 141 which intersects the first portion 140. The intersection of the first portion 140 and the second portion 141 may form a dovetail angle 144. As shown in FIG. 6D, the dovetail angle 144 may range from 1° to 20°, but may equal 10° in a preferred embodiment. The second portion 141 may not parallel the cutting face 126. The first portion 140 of the backwall 128 may intersect the left sidewall 127 at substantially a right angle. The second portion 141 of the backwall 128 may intersect the right sidewall 129 at an angle greater than 90°.

According to various embodiments, the inserts 104 may include a clearance angle 142 under the cutting edge 110 and a dovetail portion, which may be formed from the first portion 140 and the second portion 141 of the backwall 128, opposite of the cutting face 126. The clearance angle 142 may extend rearward from the cutting edge. The clearance angle 142 may extend rearward from the cutting portion 119 of the cutting edge to the backwall 128 of the insert 104. The clearance angle 142 may be formed in the range of 4° to 20°. In one embodiment, the clearance angle 142 may be 11°. In another embodiment, the clearance angle may be 6°. The clearance angle 142 may be formed to allow the cutting edge 110 to move through the turbine disk 101 without binding up in the turbine disk 101.

The dovetail portion may generally be located on the backwall 128 of the insert 104 that may be adapted to engage a correspondingly shaped dovetail slot on the cutter body 102. The dovetail portion of the insert 104 is shown in FIGS. 6B-6D and 8. A corresponding dovetail slot in the cutter body 102 may be formed. The dovetail slot in the cutter body 102 may have a depth substantially equal to the mounting portion 118 of the insert 104. The insert 104 may be placed between the wedge-like fastener 106 and the cutter body 102 and may be retained in position in that location.

Figure 7:
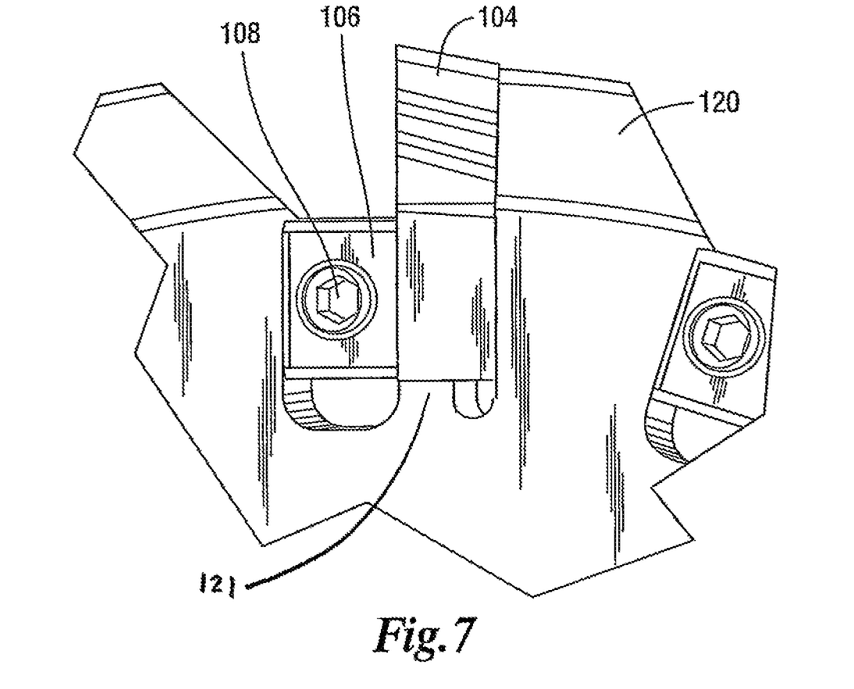
FIG. 7 is a close-up of a side view of the cutting insert retained in the cutter body by a wedge-like fastener.
Figure 8:
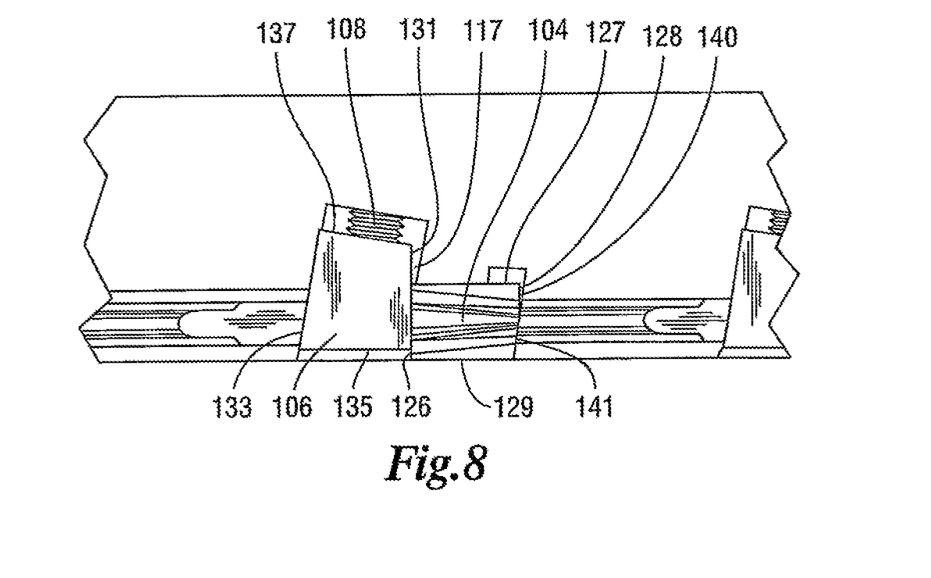
FIG. 8 is a close-up of a top view of the assembly of FIG. 7.

FIGS. 7 and 8 illustrate aspects of the mechanism for securing each of the inserts 104 to the cutter body 102. FIG. 7 is a close-up of a side view of the cutting insert 104 retained in the cutter body 102 by the wedge-like fastener 106. FIG. 8 is a close-up of a top view of the insert 104 being retained in the cutter body 104 by the wedge-like insert 106. With reference to FIGS. 7 and 8, the cutting insert 104 may be retained on the cutter body 102 by the wedge-shaped fastener 106. A support portion 120 of the cutter body 102 may support the backwall 128 of the insert 104 opposite the cutting edge 110. The insert 104 may rest upon an axially positioning surface 121. As the screw 108 securing the wedge-like fastener 106 to the cutter body 102 is tightened, the wedge-like fastener 106 and the insert 104 may interact to draw the insert 104 securely and accurately into position on the cutter body 102.

As shown in FIG. 8, the insert 104 may be placed such that the cutting face 126 faces the wedge-like fastener 106, and the backwall 128 faces the dovetail portion of the slot in the cutter body 102. The insert 104 may be secured in the cutter body 102 by tightening the wedge-like fastener 106 through use of the screw 108 securing the wedge-like fastener to the cutter body 102. Upon tightening the wedge-like fastener, the insert 104 may be drawn into the cutter body 102 and positively located. The wedge-like fastener 106 may comprise an insert face 131, a body face 133, a right face 135 and a left face 137. The insert face 131 may engage the cutting face 126 of the insert, and the body face 133 may engage a portion of the cutter body 102. The insert face 131 may connect the right face 135 and the left face 137. The insert face may intersect the right face 135 in substantially a right angle and may intersect the left face 137 at an angle greater than 90°. The body face 133 may also connect the right face 135 and the left face 137. The body face 133 may intersect both the right face 135 and the left face 137 at angles less than 90°.

According to various embodiments, the screw 108 may extend from a hole in the right side 135 of the wedge-like fastener through the left side 137 of the wedge-like fastener 106 into the cutter body 102. As the screw 108 is tightened, the wedge-like fastener may move along a path defined between the interface of the body face 133 and the portion of the cutter body. As the wedge-like fastener 106 moves along the interface, the insert face 131 may be forced in a direction toward the cutting face 126 causing the backwall 128 to engage the dovetail portion of the cutter body 102. As the wedge-like fastener 106 is tightened, the dovetail shape on the backwall 128 and the corresponding slot in the cutter body 104 may allow easy and accurate installation of the inserts 104 in the proper positions. The dovetail arrangement may also prevent axial movement of the insert 104 during the metal machining process.

The slots 116 which may be machined in turbine disks may be quite narrow, for example, 0.5 inch or less, and therefore the inserts 104 may need to be strong and held firmly in the cutter body 102. The wedge-like fastener 106 included in the cutter body 102 may apply pressure to the insert 104, thereby largely inhibiting or preventing radial movement. As discussed above, the fastener 106 may be mounted in a slot in the cutter body 102 with a screw 108 that may actuate the wedge portion positioned axially to the cutter body 102. There may exist a gap 117 between the wedge-like fastener 106 and the slot in the cutter body. This gap 117 may exist between the insert face 131 of the wedge-like fastener 106 which contacts the insert 104 and the notch of the cutter body 102. This gap may be used to ensure that the wedge-like fastener 106 engages the insert 104 when tightened and does not bind up on the cutter body 102 thus preventing proper tightening of the insert 104. This arrangement may simplify manufacture and improves rigidity of the cutter body 102 since less material may be removed from the cutter body 102 in a direction radially inward from the periphery of the cutter body 102. Such a design may also provide, upon tightening of the screw 108, a force on the insert 104 that draws the insert dovetail form back into the corresponding dovetail slot on the cutter body 102, thus better assuring proper location and positive retention. When the wedge-like fastener 106 is fully tightened, the insert 104 may be properly seated and may be retained in a positive way such that axial movement may be prevented and destructive forces may be minimized. The wedge-like fastener 106 may be positioned to contact the cutting face 126 of the insert 104, as shown in the attached figures, or alternatively to contact the backwall 128 of the insert 104, and the dovetail could be on the backwall 128 (as shown), the cutting face 126, or on both the backwall 128 and the cutting face 126 of the cutting insert 104.

The periphery of the cutter body 102 may be formed with a shape similar to the cutting edge 110 on the inserts 104. This support portion 120 of the cutter body 102 may be formed in a similar shape to the insert 104, but may be slightly smaller in dimension. The support portion 120 may provide support for the cutting portion 119 of the inserts 104. The wedge-like fastener 106 may be positioned radially inward from the cutting edge 110 portion of the insert 104 to allow full engagement of the cutting edge 110 during the machining operation. A suitable undercut may be provided at the lower rear of the dovetail slot to help insure accurate positioning of the insert 104 and allow ease of manufacture.

The cutting edge 110 shape of the insert 104 may be preferably a compound form having two or more widths, as discussed above and shown in FIG. 6A-6C. The cutting edge 110 may extend around the periphery of the cutting portion 119 of the insert 104. Although having two or more widths may be a preferred embodiment, the cutting edge 110 may only have one width. According to one embodiment, as shown in FIG. 6A, the cutting edge 110 of the insert 104 may be preferably formed to have a primary radius 146 at the tip of the insert 104 and may extend rearward from the tip at a desired width for rough cutting the base of the slot 116. There may be two secondary radii 152a-b located at or near the intersection of the cutting portion 119 and the mounting portion 118 of the insert 104. The secondary radii 152a-b may be found on opposing sides of the cutting edge 110. There may be preferably two outwardly extending tertiary radii 148a-b, or transition outwardly extending radii, at the point where the width between opposing sides of the cutting edge 110 increases. These outwardly extending tertiary radii 148a-b may be found on opposing sides of the cutting edge 110. In addition, there may be two inwardly extending tertiary radii 150a-b, inwardly extending, at the point where the width of insert 104 corresponds to the desired rough cut width of more radially outward portions of the slot 116. The inwardly extending tertiary radii 150a-b may be found on opposing sides of the cutting edge 110, as shown in FIG. 6A. The outwardly extending tertiary radius 148a and the inwardly extending tertiary radius 150a may be located between the primary radius 146 and the secondary radius 152a. Similarly, the outwardly extending tertiary radius 148b and the inwardly extending tertiary radius 150b may be located between the primary radius 146 and the secondary radius 152b.

Figure 6E:
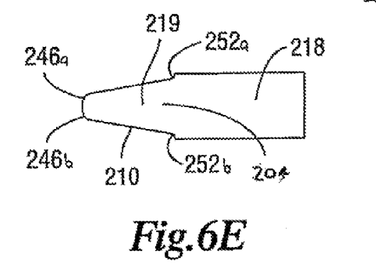
FIG. 6E is a drawing of a cutting face of another embodiment of a cutting insert.

The inserts 104 may be formed in the same manner, but may have various shapes of cutting edges. According to a second embodiment, as shown in FIG. 6E, the cutting edge 210 may extend around the periphery of the cutting portion 219 of the insert 204. The cutting edge 210 may be formed to have at least one primary radius 246a-b and may extend rearward from the tip at a desired width for rough cutting the base of the slot. In the embodiment shown in FIG. 6E, the insert has two primary radii 246a-b located at a tip of the insert 204. These primary radii 246a-b may be found on opposing sides of the cutting edge 210. In addition, there may exist two secondary radii 252a-b, which may be found on opposing sides of the cutting edge 210. These secondary radii 252a-b may be found at or near the intersection of the cutting portion 219 and a mounting portion 218.

Figure 6F:
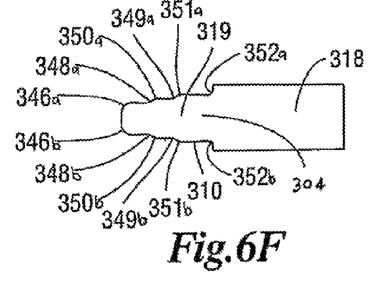
FIG. 6F is a drawing of a cutting face of another embodiment of a cutting insert.

In another embodiment, as shown in FIG. 6F, the cutting edge 310 may extend around the periphery of the cutting portion 319 of the insert 304. The cutting edge 310 of the insert 304 may be preferably formed to have at least one primary radius 346a-b at the tip of the insert 304 and may extend rearward from the tip at a desired width for rough cutting the base of the slot. In the embodiment shown in FIG. 6F, the insert has two primary radii 346a-b located at a tip of the insert 304. There may be two secondary radii 352a-b located at or near the intersection of the cutting portion 319 and the mounting portion 318 of the insert 304. The secondary radii 352a-b may be found on opposing sides of the cutting edge 310. There may be preferably two outwardly extending tertiary radii 348a-b, or transition outwardly extending radii, at the point where the width between the opposing sides of the cutting edge 310 increases. These outwardly extending tertiary radii 348a-b may be found on opposing sides of the cutting edge. In addition, there may be two inwardly extending tertiary radii 350a-b, inwardly extending, at the point where the width of insert 304 corresponds to a more radially outward portion of the slot. The inwardly extending tertiary radii 350a-b may be found on opposing sides of the cutting edge 310, as shown in FIG. 6F.

Additionally, there may be two outwardly extending quaternary radii 349a-b at the point where the width between the opposing sides of the cutting edge 310 again increases. These outwardly extending quaternary radii 349a-b may be found on opposing sides of the cutting edge 310. In addition, there may be two inwardly extending quaternary radii 351a-b, inwardly extending, at another point where the width of insert 304 corresponds to a more radially outward portion of the slot. The inwardly extending quaternary radii 351a-b may be found on opposing sides of the cutting edge 310, as shown in FIG. 6F. The outwardly extending tertiary radius 348a and the inwardly extending tertiary radius 350a may be located between the primary radius 346a and the outwardly extending quaternary radius 349a. Similarly, the outwardly extending tertiary radius 348b and the inwardly extending tertiary radius 350b may be located between the primary radius 346b and the outwardly extending quaternary radius 349b. The outwardly extending quaternary radius 349a and the inwardly extending quaternary radius 351a may be located between the inwardly extending tertiary radius 350a and the secondary radius 352a. Similarly, the outwardly extending quaternary radius 349b and the inwardly extending quaternary radius 351b may be located between the inwardly extending tertiary radius 350b and the secondary radius 352b.

Depending upon the rough groove form, the insert could be single-ended (as shown) or double-ended. The single-ended insert may only have one dovetail portion. The single-ended dovetail portion may be on the side of the insert opposite the cutting edge. The double-ended insert may have two cutting edges on opposite ends of the insert and two dovetail portions to allow the insert to be turned over in the slotting cutter to use both cutting edges. Of course, modifications to the slotting cutter and different wedge-like fasteners may be required to accommodate the double-ended insert. For example, a reverse or opposite hand slotting cutter may be required to accommodate the double-ended insert. In addition, the wedge-like fastener may need to be fabricated to account for the dovetail on both ends of the double-ended insert. Another modification that may be required in adapting the slotting cutter for use with a double-ended insert may be reducing the height of the axially positioning surface to accommodate the double-ended insert. There may be cost advantages to using a double-ended insert.

According to various embodiments, advantages of the slotting cutter 100 and inserts 104 may include the ability to completely rough machine the entire slot 110 in a turbine disk in one pass using one size or style of insert 104. Based on testing of the slotting cutter 100 and inserts 104, there appears to be no need to make multiple passes or to stock several sizes or styles of inserts 104. As disclosed, the slotting cutter 100 may be run at higher speeds and may have the rigidity important to maintaining machining accuracy and extending insert 104 life.

According to various embodiments, the cutting inserts 104 may be fabricated from a high strength whisker reinforced ceramic material. For example, WG-300® ceramic, available from Greenleaf Corporation, Saegertown, Pa., or any other suitable material may be used. The use of ceramic materials may allow the use of higher machining speeds. In fact, machining performance may be increased due to the higher machine speeds. By machining at higher speeds, the slots 116 may be cut more efficiently, and the inserts 104 may wear much slower thus increasing the life of the inserts 104. As insert 104 life increases, the need to stop the slotting cutter 100 from operating to change the worn inserts 104 decreases. The inserts 104 may be made of other materials, such as, for example, cemented carbide or any other suitable material. Depending upon the material used to fabricate the inserts 104, insert 104 performance may be affected depending upon the material being cut. For example nickel-based superalloys, such as Alloy 718 (UNS N017718) and Rene 95™ alloy, may be machined very efficiently, both in terms of material removal from the work piece and insert 104 wear, with an insert 104 fabricated from WG-300® ceramic, but may not be machined efficiently using an insert 104 fabricated from cemented carbide.

A slotting cutter 100 according to the present disclosure has been attached to a standard rotary face mill toolholder and has been used to perform numerous test cuts at various feed rates (e.g., the rate at which the slotting cutter advances through the cut) and at rotational speeds up to about 3000 RPM (i.e., about 7068 SFM). These tests included mounting the set-up on a Kitamutra HX630 Horizontal Machining Center. The various test results are summarized in Table 1. The slotting cutter 100 embodiment successfully rough machined up to 21 slots 116 in a turbine disk made of Rene 95 alloy having a hardness of 48-50 RC without significant cutting insert 104 wear. Also, the rough slots 116 produced in that test were machined in the disk at more than three times the feed rate and more than three times faster than a previous slotting cutter design the present inventor had produced and tested, and the chips from the machining operation were easy to control and handle. IPM is the inches per minute of the travel of the slotting cutter in the feed direction.

TABLE 1

| Insert Grade | SFM | RPM | IPM | Climb or Conventional Cut | Slots Produced | Comments |
|---|---|---|---|---|---|---|
| WG300 | 4005 | 1700 | 61.2 | Conventional | 4 | Insert 431903, |
|  | 4712 | 2000 | 72 |  | 8 | NP Horizontal Mill |
| WG300 | 4712 | 2000 | 54 | Conventional | 13 | Insert 431903, NP Horizontal Mill |
| WG300 | 4712 | 2000 | 36 | Conventional | 12 | Insert 431949, |

TABLE 1-continued

| Insert Grade | SFM | RPM | IPM | Climb or Conventional Cut | Slots Produced | Comments |
|---|---|---|---|---|---|---|
| WG300 | 4712 | 2000 | 90 | Conventional | 12 (6 full and 6 shallow) | NP Horizontal Mill Insert 431949, NP Horizontal Mill |
| WG300 | 5654 | 2400 | 108 | Conventional | 1 | Insert 431903, Kitamura Mill, inserts edge broke down faster, one insert chipped out, feed reduced at start of cut |
|  | 6126 | 2600 | 117 |  | 1 |  |
|  | 6597 | 2800 | 127 |  | 1 |  |
|  | 7068 | 3000 | 135 |  | 1 |  |
| WG300 | 2827 | 1200 | 18 | Conventional | 8, with 6 inserts in cutter | Insert 431903, Kitamura Mill, feed reduced at start of cut |
| WG300 | 2827 | 1200 | 54 | Conventional | 21 | Insert 431949, Kitamura Mill, feed reduced at start of cut |

Insert 431903 used in the above testing has a clearance angle of 6°. Insert 432949 used in the above testing has a clearance angle of 11°.

According to various embodiments, additional advantages of the slotting cutter 100 may include the ability to provide more inserts 104 in the same diameter cutter body 102. In one example, 18 inserts 104 were used in the same diameter cutter 102 that had been limited to 12 inserts 104 in an alternate design. By using more inserts in the same diameter cutter, insert 104 wear may be greatly reduced. More inserts 104 may allow for faster machining, which may result in higher material removal rates. Other advantages of the use of this slotting cutter 100 design described herein may include increased cutter rigidity, positive insert 104 retention, better accuracy, longer insert 104 life, and ease of manufacture. Various similar insert 104 forms, shapes, and/or sizes could be used in the same cutter body 102.

Although the foregoing description has necessarily presented only a limited number of embodiments, those of ordinary skill in the relevant art will appreciate that various changes in the articles and methods and other details of the examples that have been described and illustrated herein may be made by those skilled in the art, and all such modifications will remain within the principle and scope of the present disclosure as expressed herein and in the appended claims. For example, although the present disclosure has necessarily only presented a limited number of embodiments according to the present disclosure, it will be understood that the present disclosure and associated claims are not so limited. Those having ordinary skill will readily identify additional designs and may design and build additional designs along the lines and within the spirit of the necessarily limited number of embodiments discussed herein. It is understood, therefore, that the present invention is not limited to the particular embodiments disclosed or incorporated herein, but is intended to cover modifications that are within the principle and scope of the invention, as defined by the claims. It will also be appreciated by those skilled in the art that changes could be made to the embodiments above without departing from the broad inventive concept thereof.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. Because many machining techniques are well known in the art and because they do not facilitate a better understanding of the embodiments, a discussion of such techniques is not provided herein.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

What is claimed is:

1. A method for machining a plurality of slots in a metallic alloy part using a slotting cutter, comprising:
    retaining a plurality of inserts within a cutter body of the slotting cutter wherein each insert is fabricated from a ceramic material and comprises a cutting edge and a backwall opposite the cutting edge, wherein each insert is of a substantially identical design, and wherein the backwall opposite the cutting edge of each insert is supported by a support portion of the cutter body;
    retaining the metallic alloy part in a part holder which is configured to move the metallic alloy part, wherein the metallic alloy part comprises a turbine disk, and wherein the turbine disk is fabricated from a nickel-based superalloy;
    operating the slotting cutter to cause the cutter body to rotate about an axis;
    positioning the part holder such that a proposed slot location on the metallic alloy part is placed in line with the plurality of inserts and at a height which allows the plurality of inserts when cutting the metallic alloy part to form the depth of the slot;
    moving the part holder in a direction orthogonal to the axis of the cutter body such that the plurality of inserts contacts the metallic alloy part as the metallic alloy part moves orthogonal to the axis of the cutter body; and
    cutting a slot within the metallic alloy part with the plurality of inserts as the metallic alloy part moves orthogonally to the axis of the cutter body;
    wherein each of the plurality of inserts is retained on a periphery of the cutter body using a wedge-like fastener secured to the cutter body using a screw;
    wherein each of the plurality of inserts is retained on the cutter body between a wedge-like fastener and a retaining slot in the cutter body; and
    wherein each of the plurality of inserts and the corresponding retaining slot in the cutter body comprise corresponding dovetail surfaces.

2. The method of claim 1, wherein the nickel-based superalloy is at least one of Alloy 718 or Rene 95™ alloy.

3. The method of claim 1, wherein the inserts are fabricated from a high strength whisker reinforced ceramic material.

4. The method of claim 3, wherein the high strength whisker reinforced ceramic material is WG-300® ceramic.

5. The method of claim 1, wherein the plurality of inserts are configured to cut a slot depth of ¾ inch.

6. The method of claim 1, wherein the plurality of inserts are configured to cut a slot width of ½ inch.

7. The method of claim 1, wherein the plurality of inserts comprises at least 18 inserts.

8. The method of claim 1, wherein the dovetail surface of the insert contacts the corresponding dovetail surface of the retaining slot in the cutter body to be securely retained within the retaining slot of the cutter body by tightening the screw securing the wedge-like fastener to the cutter body thus causing the wedge like fastener to engage a surface of the insert.

9. The method of claim 1, wherein a finished profile of the slot is configured as a fir tree structured to receive a corresponding shape located on the end of a turbine blade.

10. The method of claim 1, further comprising returning the part holder to its original position.

11. The method of claim 10, further comprising rotating the metallic alloy part about an axis to an additional proposed slot location.

12. The method of claim 11, further comprising repeating said positioning, moving, cutting, returning, and rotating steps.

13. The method of claim 1, wherein the dovetail surface of the insert and the dovetail surface on the cutter body are corresponding angled surfaces.

14. The method of claim 13, wherein the dovetail surface of the insert is on at least one of the backwall of the insert and a cutting face of the insert.

15. The method of claim 1, wherein the dovetail surface of the insert comprises a first portion and a second portion that intersects the first portion at an angle to form a dovetail angle.

16. The method of claim 15, wherein the first portion and the second portion intersect at an angle in the range of 1 to 20 degrees to form the dovetail angle.

17. The method of claim 1, wherein subsequent to the step of cutting the slot, the slot is machined with a broaching machine.

18. The method of claim 1, wherein the metallic alloy part comprises one of Alloy 718 (UNS N017718) and Rene 95 alloy.

19. The method of claim 1, wherein the metallic alloy part is a part for use in a turbine.

20. The method of claim 1, wherein the metallic alloy part is a turbine disk.

* * * * *